United States Patent
Shih (10) Patent No.: US 9,853,938 B2
(45) Date of Patent: Dec. 26, 2017

(54) AUTOMATIC GENERATION OF SERVER NETWORK TOPOLOGY

(71) Applicant: Quanta Computer Inc., Taoyuan (TW)

(72) Inventor: Ching-Chih Shih, Taoyuan (TW)

(73) Assignee: QUANTA COMPUTER INC., Taoyuan (TW)

(*) Notice: Subject to any disclaimer, the term of this patent is extended or adjusted under 35 U.S.C. 154(b) by 203 days.

(21) Appl. No.: 14/687,573

(22) Filed: Apr. 15, 2015

(65) Prior Publication Data

US 2016/0072761 A1    Mar. 10, 2016

Related U.S. Application Data

(60) Provisional application No. 62/047,533, filed on Sep. 8, 2014.

(51) Int. Cl.
| | |
|---|---|
| *G06F 15/177* | (2006.01) |
| *H04L 29/12* | (2006.01) |
| *H04L 12/24* | (2006.01) |

(52) U.S. Cl.
CPC .......... *H04L 61/2015* (2013.01); *H04L 41/12* (2013.01); *H04L 61/103* (2013.01); *H04L 61/303* (2013.01); *H04L 61/3065* (2013.01)

(58) Field of Classification Search
CPC .... H04L 61/2015; H04L 61/103; H04L 41/12
USPC .......................................... 709/220, 223, 226
See application file for complete search history.

(56) References Cited

U.S. PATENT DOCUMENTS

| | | | |
|---|---|---|---|
| 2009/0024724 A1* | 1/2009 | Hirai | H04L 29/12254 709/223 |
| 2010/0250715 A1* | 9/2010 | Shigeta | H04L 29/12028 709/220 |
| 2012/0005348 A1 | 1/2012 | Chen et al. | |
| 2012/0317425 A1* | 12/2012 | Shao | H04L 12/10 713/300 |
| 2013/0097335 A1* | 4/2013 | Jiang | H04L 61/2528 709/245 |
| 2013/0166713 A1 | 6/2013 | Chiu et al. | |

FOREIGN PATENT DOCUMENTS

| | | |
|---|---|---|
| JP | 2002300166 A | 10/2002 |
| TW | 201324355 A | 6/2013 |

* cited by examiner

*Primary Examiner* — Philip B Tran
(74) *Attorney, Agent, or Firm* — Nixon Peabody LLP; Eduardo J. Quinones (57) ABSTRACT

Embodiments generally relate to network device management. The present technology discloses techniques that can enable an automatic generation of a network topology table for network management. It can use customized identifiers for servers in a server network. It can further enable an automated harvest of network information by utilizing service controllers embedded at different levels of a network.

20 Claims, 8 Drawing Sheets

| Server Topology Table ||
|---|---|
| Physical ID | IP Address |
| 1a-2b-3a-4x | 10.0.1.101 |
| 1f-2b-1d-5f | 12.0.2.098 |
| 2a-2e-3x-2m | 11.0.2.108 |
| 1a-3b-6g-9z | 10.0.2.103 |

FIG. 5A

| Sever Topology Table |||
|---|---|---|
| Physical ID | Customized MAC Address | IP Address |
| 1a-2b-3a-4x | 00-1b-63-84-45-e6 | 10.0.1.101 |
| 1f-2b-1d-5f | 00-2a-34-13-b2-22 | 12.0.2.098 |
| 2a-2e-3x-2m | 00-00-23-1d-1a-c1 | 11.0.2.108 |
| 1a-3b-6g-9z | 00-2b-4c-43-74-e3 | 10.0.2.103 |

AUTOMATIC GENERATION OF SERVER NETWORK TOPOLOGY

RELATED APPLICATIONS

This application claims priority to U.S. provisional application 62/047,533, filed Sep. 8, 2014, and entitled "RACK Addressing Mechanism", the disclosure of which is hereby incorporated herein by reference in its entirety for all purposes

FIELD OF THE INVENTION

The disclosure relates generally to computer network management.

BACKGROUND

Remote server management requires a comprehensive and accurate mapping of the network topology. This is particularly important for large-scale computing environments in which a lot of servers generally are distributed in many data centers across the world.

However, it is difficult for a server administrator to manually harvest all network port data such as MAC addresses in an automatic and efficient way. For example, the manual harvesting process often takes too long and therefore does not scale well for large server networks.

SUMMARY

The present technology discloses techniques that can enable an automatic generation of a network topology table for network management. It can use customized identifiers for identifying servers in a network. It can further enable an automated harvest of these customized identifiers by utilizing service controllers embedded at different levels of a network.

According to some embodiments, the present technology can use a customized network device identifier to represent the network device (e.g., a server) for reserving a predetermined Internet Protocol (IP) address in a DHCP server. For example, the network device identifier can indicate a relationship of the network device to other network devices in the server network. For example, the identifier can be a location identifier that describes the physical location of the network device (e.g. a server).

According to some embodiments, a customized Dynamic Host Configuration Protocol (DHCP) server can use a customized network device identifier to assign and reserve an available IP address to the requesting network device. Additionally, the customized DHCP server can store the network information in a topology table (e.g., a DHCP table) for IP address assignments.

According to some embodiments, when the customized network identifier is a customized MAC address, a generic DHCP server can be used to assign and reserve an IP address.

According to some embodiments, the present technology can enable a service controller to automatically generate a DHCP request packet with the customized network device identifier. For example, a Baseboard Management Controller (BMC) can generate a DHCP request packet with the identifier and request an IP address from a DHCP server. According to some embodiments, a Rack Management Controller (RMC) or a Chassis Management Controller (CMC) can generate DHCP request packets having a group of network device identifiers and send them to the DHCP servers.

Although many of the examples herein are described with reference to static DHCP packets to assign and reserve IP addresses, it should be understood that these are only examples and the present technology is not limited in this regard. Rather, any protocol that provides IP information may be used, such as protocols for dynamic or automatic IP address assignment.

Additionally, even though the present discussion uses a customized identifier (e.g., a physical location identifier or a customized MAC address) as an example approach of how to identify a computing device in a network, the present technology is applicable to other IP address assignment techniques.

Additional features and advantages of the disclosure will be set forth in the description which follows, and, in part, will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Various embodiments or examples ("examples") of the invention are disclosed in the following detailed description and the accompanying drawings.

DETAILED DESCRIPTION

Various embodiments of the present technology are discussed in detail below. While specific implementations are discussed, it should be understood that this is done for illustration purposes only. A person skilled in the relevant art will recognize that other components and configurations may be used without departing from the spirit and scope of the present technology.

In data center management, remote server management (e.g., out-of-band management) can provide a centralized and flexible administration solution. Using out-of-band management, an administrator can monitor the operation status of a large number of servers via a network such as a LAN (Local Area Network). For example, an administrator can remotely manage servers when the server's main CPU does not have power. The administrator can adjust BIOS (Basic Input/Output System) settings or monitor a server's physical status such as temperature, voltage, and fan speed, etc. However, remote server management relies on an accurate mapping of the server network topology.

A server network topology comprises comprehensive network information of all network devices in a selected network. Such network information includes, for example, Internet Protocol (IP) addresses, Media Access Control (MAC) addresses, or domain names of the network devices. One example is a DHCP table, which matches network devices' IP addresses with their MAC addresses.

Furthermore, remote server management often relies on static DHCP allocation technology. In a static DHCP allocation, a DHCP server allows the administrator to reserve IP addresses for the servers so that the same servers are always assigned the same IP addresses. In order to reserve IP addresses using existing techniques, the administrator needs to manually collect each server's MAC address, input the MAC address in the DHCP server, and assign a predetermined IP address to the server. This manual and difficult IP-allocation process is not appropriate for large-scale server networks.

Thus, there is a need to generate a server network topology in a reliable and automatic way that results in an efficient mapping of the server network.

The present technology includes techniques that can enable an automatic generation of a network topology table (e.g. a DHCP table) for network management. It can use customized identifiers for servers in a server network. It can further enable an automated harvest of network information by utilizing service controllers embedded at different levels of a server network.

According to some embodiments, the present technology can be implemented through a static IP allocation process via DHCP. DHCP is a network protocol for enabling a DHCP server to assign IP addresses for network devices on an Internet Protocol (IP) network. A DHCP server can assign IP addresses from an IP-address pool that can span several subnets. Typically, when a DHCP server receives a DHCP request packet from a network device for an IP address, the DHCP server can identify a MAC address embedded in the packet and use the MAC address to assign an available IP address. Additionally, the MAC address may be generic and randomly assigned by the manufacturer of the device, which carries little useful meaning for network management.

According to some embodiments, instead of using the manufacturer-assigned MAC address in the DHCP packet, the present technology can use a customized network device identifier to represent the network device (e.g., a server). For example, the network device identifier can indicate a relationship (such as a physical location) of the network device to other network devices in the server network. In some embodiments, the naming logic of the customized network device identifier is known to an administrator, who can then determine a physical location of the network device through its customized identifier. For example, the identifier can be a location identifier that describes the relative physical location of the network device (e.g. a server) in a large group of servers. An example of a location identifier can be POD1_RACK1_Chassis1_Node1. According to some embodiments, a POD is a group of racks in a data center, which can be identified by a POD identifier (e.g. POD1). Similarly, a server rack can be identified by a RACK identifier (e.g. RACK1). A chassis can be identified by a CHASSIS identifier (e.g. Chassis1). Finally, a node can be identified by a node identifier (e.g. Node1).

Additionally, according to some embodiments, the format of the customized identifier can be identical to the MAC address format (xx-xx-xx-xx-xx-xx), as six groups of two hexadecimal digits (0 to 9, a to f, or A to F). However, according to some embodiments, the format of the identifier can be different from the MAC address format.

According to some embodiments, the customized network device identifier can be additional information added to a conventional DHCP packet including a manufacturer-assigned MAC address. This way, the DHCP packet can still keep the manufacturer-assigned MAC address in the packet. For example, the present technology can utilize an "option" section defined in the DHCP packet format to include the additional customized identifier.

According to some embodiments, a customized DHCP server can identify the network device identifier embedded in the packet and use it to assign an available IP address to the requesting network device.

Additionally, the customized DHCP server or a network topology server can store the network information in a topology table (e.g. a DHCP table) for DHCP IP allocation. For example, the topology table can pair a customized identifier to an assigned IP address. The topology table can comprise other network information such as domain names and manufacturer-assigned MAC addresses.

According to some embodiments, to avoid using a customized DHCP server, the present technology can further generate a customized MAC address so that a generic DHCP server can be used. For example, a service controller (e.g. a Baseboard Management Device, (BMC)) can convert a location identifier to a customized MAC address, which can be treated at the DHCP server similarly to a manufacturer-assigned MAC. Furthermore, because the logic to convert a location identifier to a customized MAC address may be known, the customized MAC addresses can be predicted and be used to pair with the predetermined IP addresses, for example, in a DHCP table.

Furthermore, the present technology discloses techniques that can enable a service controller to automatically generate a DHCP packet with the customized identifier and send the packet to the DHCP server. For example, a BMC is an independent and embedded microcontroller that, in some embodiments, is responsible for the management and monitoring of the main CPU, firmware and operating system. According to some embodiments, the BMC can receive a customized identifier, for example, from another service controller such as a RMC. The BMC can then generate a DHCP packet with the identifier and send it to a DHCP server. According to some embodiments, the BMC can receive the network device identifier from another network management device, such as a switch in communication with the BMC.

According to some embodiments, a RMC is an independent and embedded microcontroller that can pool server status data from each of the BMCs. The RMC can use Intelligent Platform Management Bus/Bridge (IPMB), which is an enhanced implementation of $I^2C$ (Inter-Integrated Circuit), to communicate with the BMC. According to some embodiments, the RMC can receive a primary network device identifier from the DHCP server, and then assign secondary network device identifiers to all the BMCs in a rack. According to some embodiments, the RMC can send the secondary network identifiers, on behalf of their related BMCs, to the DHCP server.

Additionally, a primary service controller can manage another controller; a secondary service controller can be managed by another controller. A primary service controller can operate at a higher hierarchy level than a secondary service controller does. Because the RMC can manage the BMC, the RMC can be a primary service controller and the BMC can be a secondary service controller.

According to some embodiments, after receiving the customized network device identifiers (e.g. a location identifier, or a customized MAC address), the DHCP server can automatically generate a DHCP table that pairs each identifier with a predetermined IP address.

Figure 1:
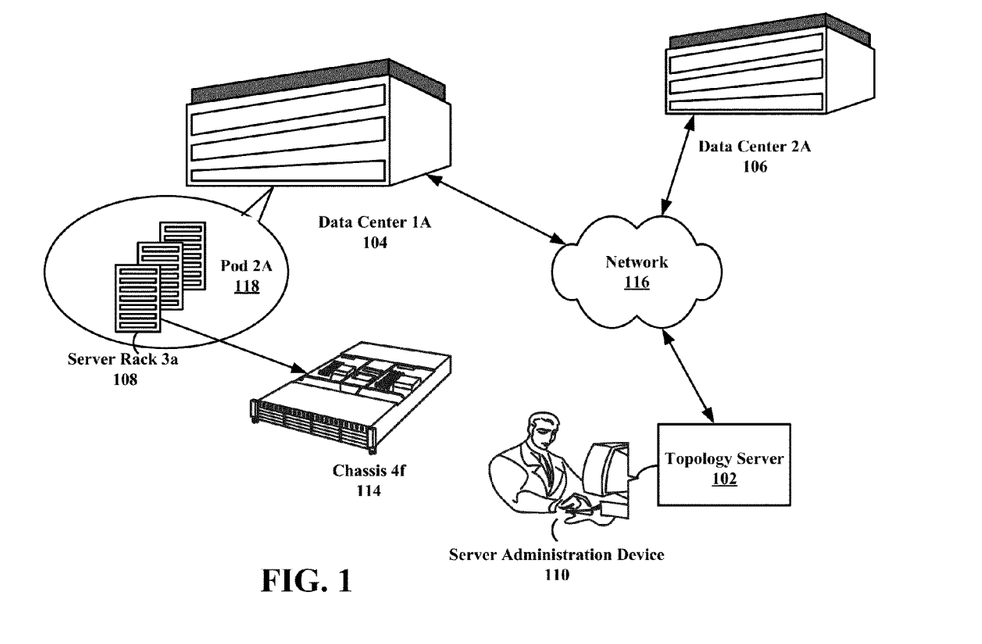
FIG. 1 illustrates an example of the automatic network topology management system, according to some embodiments.

FIG. 1 illustrates an example of the automatic network topology management system, according to some embodiments. As shown in FIG. 1, the automatic network topology management system can comprise Topology Server 102 (e.g. a DHCP server) that is managed by Server Administration Device 110 via Network 116. (e.g., LAN). It should be appreciated that the topology in FIG. 1 is an example, and any numbers of racks, chassis and network components may be included in the system of FIG. 1.

According to some embodiments, the automatic network topology management system can manage a group of data centers located at different regions (e.g., Data Center 1A 104 and Data Center 2A 106). According to some embodiments, a data center can have a multi-level computing structure comprising, for example, pods, racks, chassis and nodes. According to some embodiments, a POD is a group of racks in a data center, which can be identified by a POD identifier; a rack can be identified by a RACK identifier; a chassis can be identified by a CHASSIS identifier; and, finally, a node can be identified by a node identifier.

As shown in FIG. 1, Data Center 1A 104, for example, can have several pods (e.g., Pod 2A 118). Pod 2A 118 can have multiple server racks (e.g. Server Rack 3a 108). Server Rack 3a 108 can further comprise a group of chassis (e.g., Chassis 4f, 114). Chassis 4f 114 can have multiple computing nodes or servers (not shown). According to some embodiments, an administrator can assign, for example, data center location IDs to the data centers (e.g., Data Center 1A 104 and Data Center 2A 106, pod location IDs to the pods (e.g. Pod 2A 118), chassis location IDs to the chassis (e.g. Chassis 4f 114). Accordingly, a RMC or CMC (not shown) that manages Chassis 4f 114 can, for example, have a customized primary identifier of 1A-2A-3a-4f. According to some embodiments, a RMC can manage a group of BMCs (not shown), each being associated with a computing node, within a rack or chassis.

According to some embodiments, the RMC (or CMC) has all the node location information within a rack, so it can automatically assign customized secondary identifiers to the BMCs (and their corresponding computing nodes). For example, the RMC can assign the individual node identifier (e.g., 1A-2A-3a-4f-3f) to a node 3f (not shown). The individual node identifier is based on the chassis identifier (e.g., 1A-2A-3a-4f) and the node identifier (e.g., 3f). Additionally, the administrator can decide the logic for the RMC to assign the individual node identifier. For example, computing nodes 1-10 within Chassis 4f 114 are consequentially named 1f, 2f, 3f, . . . 10f.

Thus, because the rationale or logic associated with assigning network identifiers may be known, the DHCP server can predict a group of network device identifiers and reserve IP addresses for static IP allocation.

Still referring to FIG. 1, according to some embodiments, after receiving the customized network device identifiers (e.g. a location identifier, or a customized MAC address), Topology Server 102 can automatically generate a DHCP table that pairs each identifier with a predetermined IP address. Topology Server 102 can further harvest other network information including, for example, manufacturer-assigned MAC addresses, or domain names of the network devices.

Accordingly, because the manufacturer-assigned MAC address may be supplemented or replaced by a customized identification, the administrator does not need to manually collect MAC addresses from each computing node or server. According to some embodiments, the administrator only needs to collect the MAC address of a rack. Furthermore, leveraging service controllers at different levels (e.g. RMC or BMC), Topology Server 102 can automatically generate a topology table (e.g. a DHCP table) having the harvested network information for network topology mapping. Additionally, the administrator can, using the topology table, remotely manage servers at Service Administration Device 110.

Figure 2:
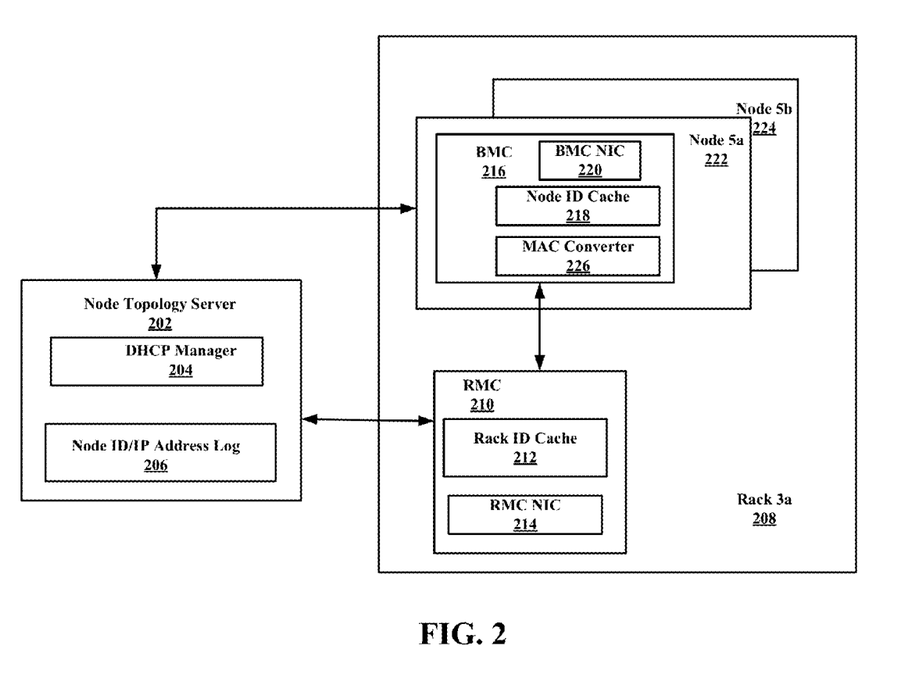
FIG. 2 is a block diagram illustrating an example of the automatic network topology management system, according to some embodiments.

FIG. 2 is a block diagram illustrating an example of the automatic network topology management system, according to some embodiments. As shown in FIG. 2, according to some embodiments, Rack 3a 208 can comprise a group of computing nodes or servers (e.g. Node 5a 222 and Node 5b 224). Each node is managed by a service controller such as a BMC (Baseboard Management Controller), which can manage the network information of the node. For example, Node 5a 222 is associated with BMC 216, which further comprises BMC NIC (Network Interface Controller) 220 and Node ID Cache 218. Additionally, Node 5b 224 is associated with another BMC having an independent NIC (not shown). According to some embodiments, BMC 216 can further comprise MAC Converter 226. RMC 210 can comprise Rack ID Cache 212 and RMC NIC 214.

According to some embodiments, RMC 210 is an independent microprocessor that can manage the operation status of computing nodes in Rack 3a 208. RMC 210 can manage BMC 216 and other BMCs through a communication protocol for internal data transmission within a server. An example of such protocol is IPMB, a message-based communication protocol. Accordingly, because RMC 210 can manage BMC 216, RMC 210 can be a primary service controller and BMC 216 can be a secondary service controller.

According to some embodiments, RMC 210 can receive a customized primary identifier for Rack 3a, for example, 1f-2d-3a, and save it in Rack ID cache 212. The customized identifier 1f-2d-3a, in some embodiments, can represent a relationship of Rack 3a with respect to other racks in a data center. According to some embodiments, the primary identifier can be a location identifier. According to some embodiment, RMC 210 can receive the primary identifier from Node Topology Server 202 (e.g. a DHCP server). According to some embodiments, RMC 210 can receive the primary identifier from an administrator via an administration device.

According to some embodiments, RMC 210 can assign a group of customized secondary identifiers to nodes in Rack 3a, based on the primary identifier for Rack 3a. For example, RMC 210 can assign "1f-2d-3a-5a" to Node 5a 222. RMC 210 can also assign "1f-2d-3a-5b" to Node 5b 224. According to some embodiments, the administrator can define the naming logic for RMC 210 to assign the individual node identifier. For example, computing nodes 1-10 within Rack 3a 208 are consequentially named 5a, 5b, 5c . . . 5j.

According to some embodiments, RMC 210 can transmit the customized secondary network device identifiers to each node via the associated BMC. For example, RMC 210 can transmit node identifier "1f-2d-3a-5a" to BMC 216 by a network interface between RMC NIC 214 and BMC NIC 220. According to some embodiments, BMC 216 can store node identifier "1f-2d-3a-5a" in Node ID Cache 218, which maybe a storage medium reserved for Node ID storage. According to some embodiments, RMC 210 can send secondary network device identifiers to the DHCP server on behalf of their related BMCs, including MBC 216.

Still referring to FIG. 2, Node Topology server 202, in some embodiments, can be a DHCP server. It can further comprise a DHCP Manager 204 for assigning IP address to the requesting devices. Node Topology Server 202 can include a topology table that can be saved in Node ID/IP Address Log 206. The topology table can comprise comprehensive network information of all nodes in a data center. For example, it can include manufacturer-assigned MAC addresses, or domain names. For example, the topology table can combine domain name information from a Domain Name Server (DNS) table.

According to some embodiments, Node Topology Server 202 can assign a customized primary identifier for Rack 3a 208 (e.g., "1f-2d-3a") and transmit the primary identifier to RMC 210. RMC 210, pursuant to methods described herein, can assign a group of secondary network device identifiers to nodes in Rack 3a 208, based on the primary identifier for Rack 3a 208. RMC 210 can further transmit the secondary network device identifiers (e.g., "1f-2d-3a-5a") to each node via the associated BMC, for example, BMC 216.

According to some embodiments, Node Topology Server 202 can receive a DHCP request packet having a secondary node identifier (e.g., "1f-2d-3a-5a") from BMC 216. According to some embodiments, Node Topology Server 202 can receive a group of secondary node identifiers from RMC 210 that manages the BMCs. According to some embodiments, the format of the secondary node identifier can be identical to the MAC address format (xx-xx-xx-xx-xx-xx), as six groups of two hexadecimal digits.

According to some embodiments, the DHCP server can use both the MAC address and the secondary node identifier. For example, the DHCP packet can store the secondary node identifier in the "option" section defined by the DHCP format. Additionally, the DHCP server can be customized to recognize the secondary node identifier embedded in the option section.

According to some embodiments, to avoid using a customized DHCP, a service controller can generate a customized MAC address so that a generic DHCP server can be used. For example, BMC Converter 226 can convert a secondary node identifier to a customized MAC address and replace the manufacturer-assigned MAC address. Because the customized MAC address is in the same format as six groups of two hexadecimal digits (0 to 9, a to f, or A to F), the DHCP server does not need to be customized. Furthermore, because the logic to convert a location identifier to a customized MAC address is known, the customized MAC addresses can be predicted and be used to pair with the predetermined IP addresses, for example, in a DHCP table.

Similarly, RMC 210 can covert a group of secondary node identifiers to another group of customized MAC addresses, which can replace the manufacturer-assigned MAC addresses for IP address reservations.

Based on the automatically collected network device identifiers, Node Topology Server 202 can then assign or bind the corresponding IP addresses to these network devices. According to some embodiments, Node Topology servers 202 can use DHCP Manager 204 to assign the IP addresses from a reserved IP address pool. According to some embodiments, Node Topology Server 202 can generate and send a DHCP response packet to Node 5a 222, including the assigned IP address. According to some embodiments, Node Topology Server 202 can save the assigned IP addresses/secondary node identifiers (or customized MAC addresses in some embodiments) in Node ID/IP Address Log 206.

According to some embodiments, the present technology can enable a dynamic MAC address collection. For example, a system administrator can first manually assign a MAC and an IP pair for Rack 3a 208 to Node Topology Server 202. An example of Node Topology Server 202 can be a DHCP server. RMC 210 can request and receive the MAC and the IP pair for Rack 3a 208 by communicating with Node Topology Server 202. Next, a Pod ID and a Rack ID can be assigned to RMC 3a 208. For example, the Pod ID is 1 and the Rack ID is 1. Next, RMC 210 can assign respective Pod ID and Rack ID to each BMC within Rack 3a 208, by using IPMB messaging.

According to some embodiments, BMC 216 can request its IP address from Node Topology Server 202. Consequently, Node Topology Server 202 can respond to BMC 216 with a corresponding IP address. For example, Pod1_Rack1_Node1_IP. BMC 216 can then communicate with other network devices using the assigned IP address.

According to some embodiments, the present technology can enable an automatic MAC address collection by utilizing the RMC. For example, a system administrator can manually assign a MAC and an IP pair for RMC 210 to Node Topology Server 202. An example of Node Topology Server 202 can be a DHCP server. According to some embodiments, RMC 210 can request its IP address from Node Topology Server 202. Consequentially, RMC 210 can receive an assigned IP address (e.g., POD1_RACK1_RMC_IP) from Node Topology Server 202.

Using a System Management Software (SMS), the system administrator can query MAC addresses for all nodes within Rack 3a 208 by communicating with RMC 210. In response to the query, RMC 210 can collect MAC addresses of each node by communicating with its corresponding BMC via, for example, IPMB messages. Next, RMC 210 can respond to the SMS by transmitting MAC addresses of each node.

According to some embodiments, the SMS can store the MAC information, such as MAC and IP pairs of all Nodes within Rack 3a 208, to Node Topology Server 202. Further, Node Topology Server 202 can comprise a DHCP Manager 204 that can store the MAC information to a Node ID/IP Address Log 206.

According to some embodiments, when BMC 216 of Node 5a 222 queries Node Topology Server 202 for its IP address, DHCP Manager 204 can retrieve its corresponding MAC information, such as an assigned MAC and IP pair, from Node ID/IP Address Log 206. DHCP Manager 204 can then transmit the MAC information to BMC 216. Consequentially, BMC 216 can communicate with other network devices, such as a SMS, using the assigned MAC and IP pair.

Figure 3:
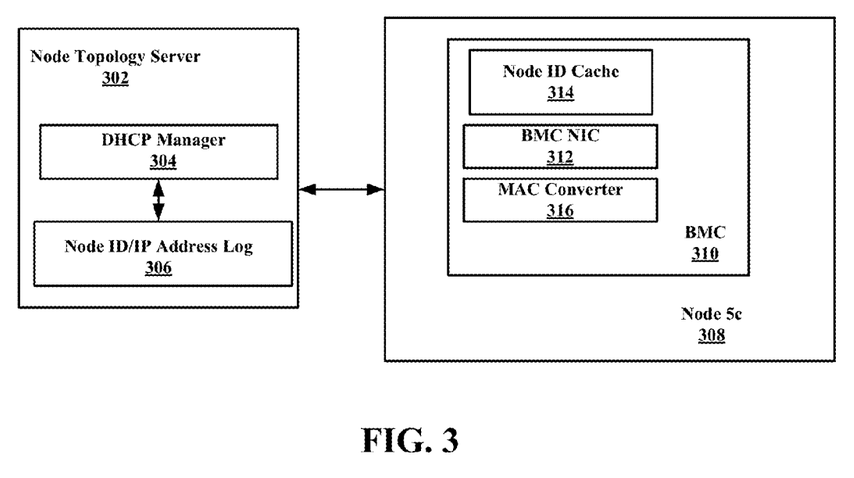
FIG. 3 is another block diagram illustrating another example of the automatic network topology management system, according to some embodiments.

FIG. 3 is another block diagram illustrating another example of the automatic network topology management system, according to some embodiments. According to some embodiments, BMC can provide a customized identifier to Node Topology Server 302 for the computing node to which it belongs. Node Topology Server 302 can use the identifier to assign an IP address and save the pair in a topology table.

According to some embodiments, BMC 310 is an independent microprocessor that can manage the operation status of Node 5c 308. BMC 310 can communicate with other BMCs or network devices through a dedicated network interface (e.g., BMC NIC 312). According to some embodiments, BMC 310 can comprise Node ID Cache 314 and MAC Converter 316.

According to some embodiments, BMC 310 can receive a customized identifier for Node 5c 308, for example, 1f-2d-3a-5c, and save it in Node ID Cache 314. The customized identifier 1f-2d-3a-5c, in some embodiments, can represent a relationship of Node 5c 308 with respect to other nodes in a data center. According to some embodiments, the customized identifier can be a location identifier. According to some embodiments, BMC 310 can receive the customized identifier from another service controller (e.g. RMC) or a switch. According to some embodiments, BMC 310 can receive the customized identifier from an administrator via an administration device (not shown). According to some embodiments, MAC converter 310 can further convert a customized identifier to a customized MAC address, which has six groups of two hexadecimal digits. (e.g., xx-xx-xx-xx-xx-xx).

According to some embodiments, BMC 310 can send the customized identifier in an option section of a DHCP packet to Node Topology Server 302, or send the customized MAC address in a regular DHCP packet.

Still referring to FIG. 3, according to some embodiments, a customized Node Topology Server 302 can recognize the customized identifier that is saved in the option section of the packet, and assign an IP address for Node 5c 308. According to some embodiments, a generic Node Topology Server 302 can use the customized MAC address Node to assign the IP address.

For example, Node Topology Server 302 can further comprise DHCP Manager 304 for assigning or binding an IP addresses to a network device. DHCP Manager 304 can assign an IP address from an IP address pool for Node 5c 308. According to some embodiments, Node Topology Server 302 can save the assigned IP address and the customized identifier in Node ID/IP Address Log 306.

Node Topology Server 302 can include a topology table in Node ID/IP Address Log 306 for mapping the network topology. The topology table can comprise comprehensive network information of all nodes in a data center. For example, it can include at least some of IP addresses, customized network device identifiers, or domain names of the network devices. For example, the topology table can combine information from a Domain Name Server (DNS) table.

Figure 4:
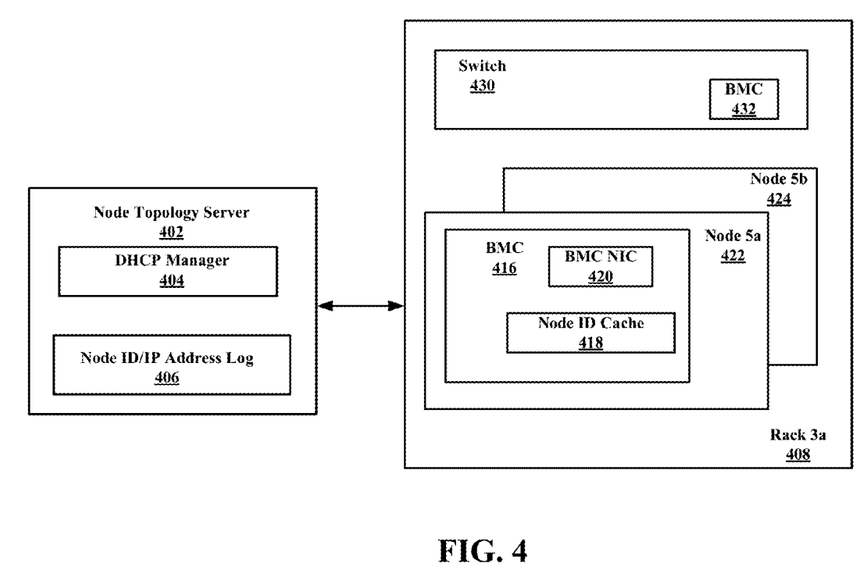
FIG. 4 is another block diagram illustrating an example of the automatic network topology management system, according to some embodiments.

FIG. 4 is a block diagram illustrating an example of the automatic network topology management system, according to some embodiments. It should be appreciated that the topology in FIG. 4 is an example, and any numbers of racks, nodes, controllers, switches and network components may be included in the system of FIG. 4.

As shown in FIG. 4, according to some embodiments, Rack 3a 408 can comprise a group of computing nodes or servers (e.g. Node 5a 422 and Node 5b 424). Each node is managed by a service controller such as a BMC, which can manage the network information of the node. For example, Node 5a 422 is associated with BMC 416, which further comprises BMC NIC 420 and Node ID Cache 418. Additionally, Node 5b 424 is associated with another BMC having an independent NIC (not shown). According to some embodiments, BMC 416 can further comprise MAC Converter (not shown).

According to some embodiments, Rack 3a 408 can comprise a Switch 430 for managing network traffic of the rack. An example of Switch 430 is a top-of-rack (TOR) switch that can be typically placed at the top of Rack 3a 408. As Switch 430 can communicate with each node within Rack 3a 408, it can receive MAC information of each Node, such as Node 5a 422 and Node 5b 424. Additionally, Switch 430 can comprise a BMC 432 that can manage the MAC information of these Nodes. For example, Switch 430 can associate a MAC address of Node 5a with a downstream port (not shown) in communication with Node 5a. Accordingly, the node addressing assignment can be based on the port numbers of Switch 430.

For example, a system administrator can first manually assign an MAC and an IP pair for BMC 432 of Switch 430 to Node Topology Server 402. An example of Node Topology Server 402 can be a DHCP server. Using a System Management Software (SMS), the system administrator can query MAC addresses for all nodes within Rack 3a 408 by communicating with BMC 432. In response to the query, BMC 432 can transmit MAC information of Nodes within Rack 3a 408 to the SMS. According to some embodiments, the SMS can store the MAC information, such as MAC and IP pairs of all Nodes within Rack 3a 408, to Node Topology Server 402. Further, Node Topology Server 402 can comprise a DHCP Manager 404 that can store the MAC information to a Node ID/IP Address Log 406.

According to some embodiments, when BMC 416 of Node 5a 422 queries Node Topology Server 402 for its IP address, DHCP Manager 404 can retrieve its corresponding MAC information, such as an assigned MAC and IP pair, from Node ID/IP Address Log 406. DHCP Manager 404 can then transmit the MAC information to BMC 416. Consequentially, BMC 416 can communicate with other network devices, such as a SMS, using the assigned MAC and IP pair.

Figure 5A:
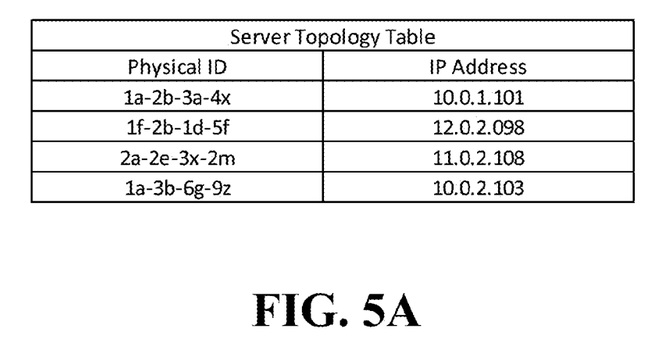
FIG. 5A is a chart illustrating part of a server topology table, according to some embodiments.

FIG. 5A is a chart illustrating part of a network topology including customized identifiers and the corresponding IP addresses, according to some embodiments. According to some embodiments, FIG. 5A shows part of the Server Topology Table including physical ID information of a group of computing nodes and their corresponding IP addresses. The Server Topology Table can further include other network topology information such as MAC addresses, domain names, serial numbers, or any combination of network information. The server administrator can use the Server Topology Table to mange the server network.

According to some embodiments, the Server Topology Table can be saved and maintained by a topology server. According to some embodiments, the topology server can be a DHCP server. Additionally, according to some embodiments, the topology server can update the Server Topology Table periodically, for example, every 30 minutes. According to some embodiments, the topology server may update the Server Topology Table only after detecting changes in any parameters.

Figure 5B:
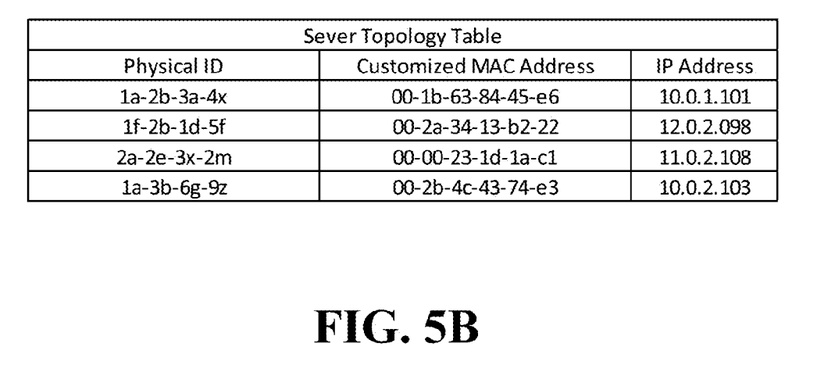
FIG. 5B is another chart illustrating part of another server topology table, according to some embodiments.

FIG. 5B is another chart illustrating part of a network topology including customized identifiers, customized MAC addresses and the corresponding IP addresses, according to some embodiments. According to some embodiments, the Sever Topology Table in FIG. 4B can comprise Physical IDs, Customized MAC Addresses and their corresponding IP addresses. According to some embodiments, the Server Topology Table can comprise only Customized MAC Addresses and their corresponding IP addresses.

Figure 6:
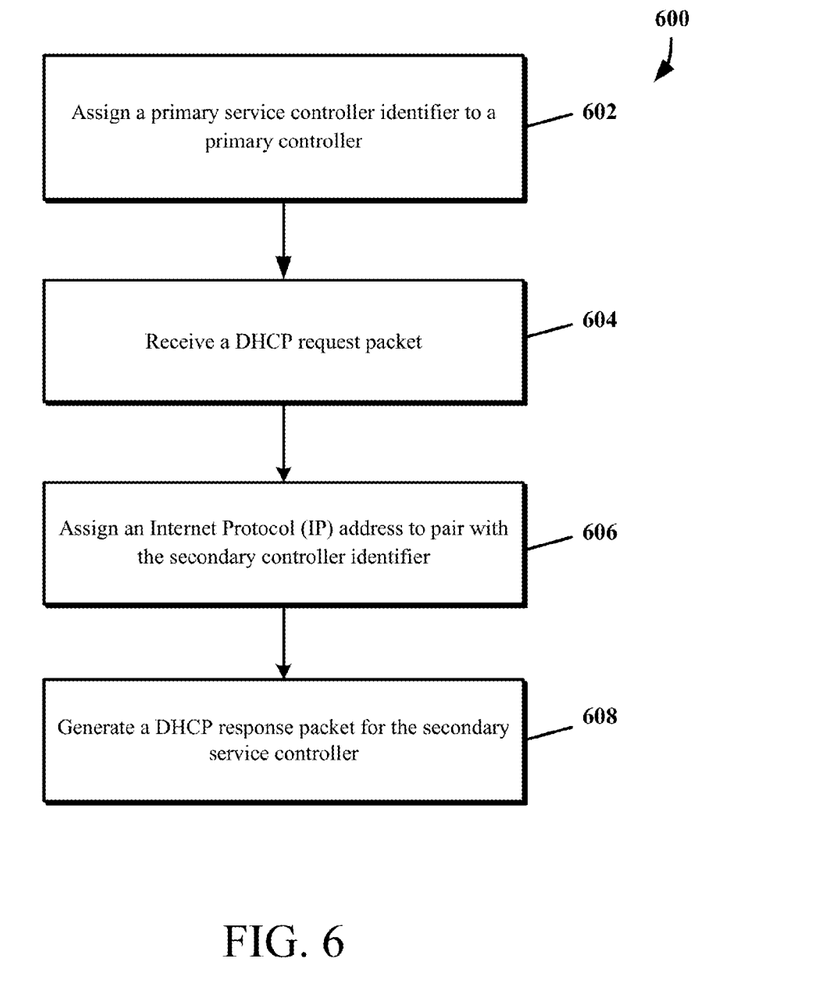
FIG. 6 is an example flow diagram for the automatic network topology management system, according to some embodiments.

FIG. 6 is an example flow diagram 600 for the automatic network topology management system, according to some embodiments. It should be understood that there can be additional, fewer, or alternative steps performed in similar or alternative orders, or in parallel, within the scope of the various embodiments unless otherwise stated. At step 602, a topology server can assign a primary service controller identifier to a primary controller. For example, a DHCP server can assign a primary service controller identifier to a RMC. The RMC can then assign a group of secondary service controller identifiers to a group of BMCs, each of the BMCs being associated with a computing node within a rack.

At step 604, the DHCP server can receive a DCHP request packet for an IP address, For example, a BMC can send a DHCP request packet having a secondary service controller identifier. In another example, a RMC can send a DHCP request packet having a secondary service controller identifier.

At step 606, the DHCP server can assign an IP address to pair with the secondary controller identifier. For example, the DHCP server can select an IP address from an IP address pool and match it with the secondary controller identifier in the requesting packet.

At step 608, the DHCP server can generate a DHCP response packet for the secondary service controller. For example, the DHCP server can generate a DHCP response packet for the BMC and thus inform the BMC's IP address.

Figure 7:
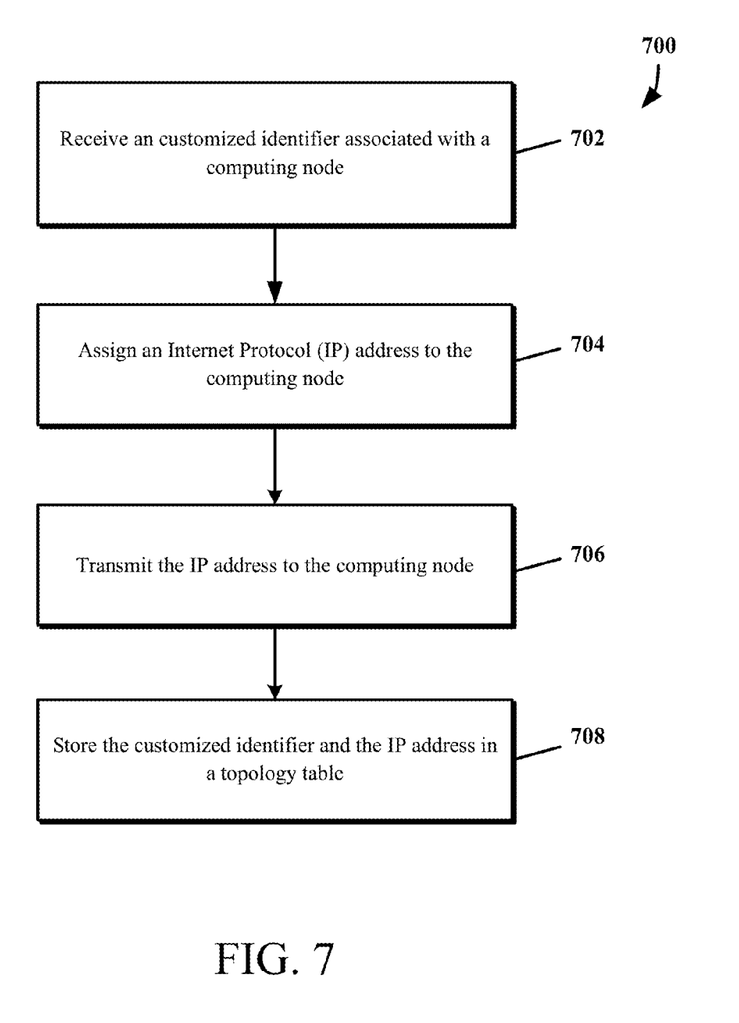
FIG. 7 is another example flow diagram for the automatic network topology management system, according to some embodiments.

FIG. 7 is another example flow diagram 700 for the automatic network topology management system, according to some embodiments. It should be understood that there can be additional, fewer, or alternative steps performed in similar or alternative orders, or in parallel, within the scope of the various embodiments unless otherwise stated. At step 702, a topology server can receive a customized identifier associated with a computing node. For example, a DHCP server can receive a location identifier from a BMC of a server.

At step 704, the topology server can assign an IP address to the computing node. For example, the DHCP server can assign an IP address based on the location identifier.

At step 706, the topology server can transmit the IP address to the computing node. For example, the DHCP server can transmit the IP address to the computing node by LAN.

At step 708, the topology server can store the customized identifier and the IP address in a topology table. For example, the DHCP server can save the location identifier and the IP address to a topology table. The DHCP server can further harvest other network information such as MAC addresses and domain names for storing in the topology table.

Figure 8:
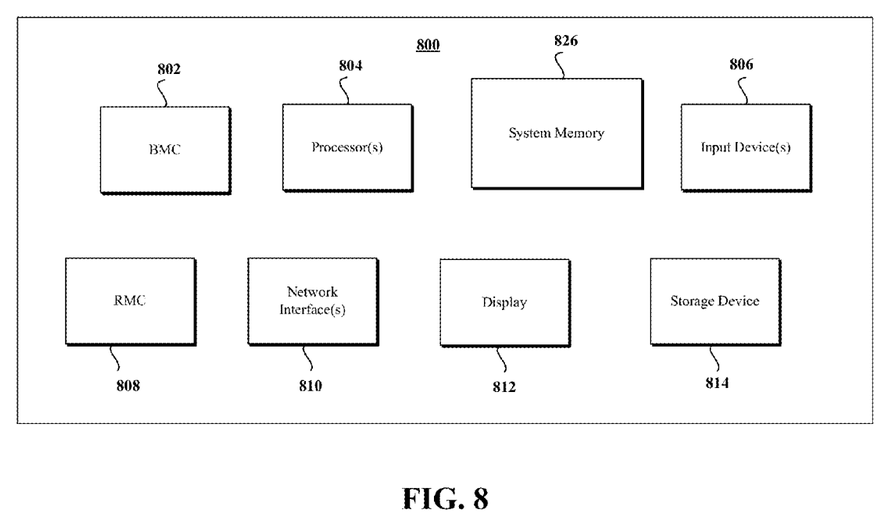
FIG. 8 illustrates a computing platform of a computing device, according to some embodiments.

FIG. 8 illustrates an example system architecture 800 for implementing the systems and processes of FIGS. 1-7. Computing platform 800 includes one or more buses which interconnect subsystems and devices, such as: BMC 802, processor 804, storage device 814, system memory 826, a network interface(s) 810, and RMC 808. Processor 804 can be implemented with one or more central processing units ("CPUs"), such as those manufactured by Intel® Corporation—or one or more virtual processors—as well as any combination of CPUs and virtual processors. Computing platform 800 exchanges data representing inputs and outputs via input-and-output devices input devices 806 and display 812, including, but not limited to: keyboards, mice, audio inputs (e.g., speech-to-text devices), user interfaces, displays, monitors, cursors, touch-sensitive displays, LCD or LED displays, and other I/O-related devices.

According to some examples, computing architecture 800 performs specific operations by processor 804, executing one or more sequences of one or more instructions stored in system memory 826. Computing platform 800 can be implemented as a server device or client device in a client-server arrangement, peer-to-peer arrangement, or as any mobile computing device, including smart phones and the like. Such instructions or data may be read into system memory 826 from another computer readable medium, such as storage device 814. In some examples, hard-wired circuitry may be used in place of or in combination with software instructions for implementation. Instructions may be embedded in software or firmware. The term "computer readable medium" refers to any tangible medium that participates in providing instructions to processor 804 for execution. Such a medium may take many forms, including, but not limited to, non-volatile media and volatile media. Non-volatile media includes, for example, optical or magnetic disks and the like. Volatile media includes dynamic memory, such as system memory 826.

Common forms of computer readable media includes, for example: floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 824 for transmitting a computer data signal.

In the example shown, system memory 826 can include various modules that include executable instructions to implement functionalities described herein. In the example shown, system memory 826 includes a log manager, a log buffer, or a log repository—each can be configured to provide one or more functions described herein.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed is:

1. A method, comprising:
assigning, at a Dynamic Host Configuration Protocol (DHCP) server, a primary service controller identifier to a primary service controller, the primary service controller being associated with a secondary service controller and operable to assign a specific secondary service controller identifier to the secondary service controller;
receiving a DHCP request packet from the secondary service controller, the DHCP request packet containing the specific secondary service controller identifier assigned by the primary service controller;

assigning, based on the secondary service controller identifier, an Internet Protocol (IP) address to pair with the secondary service controller identifier; and generating a DHCP response packet for the secondary service controller, the DHCP response packet containing the IP address.

2. The method of claim 1, wherein the DHCP request packet is generated by at least one of the primary service controller or the secondary service controller.

3. The method of claim 1, wherein the primary service controller identifier comprises physical location information of the primary service controller, and wherein the secondary service controller identifier comprises physical location information of the secondary service controller.

4. The method of claim 1, wherein the primary service controller identifier comprises a customized primary MAC address, and wherein the secondary service controller identifier comprises a customized secondary MAC address.

5. The method of claim 1, wherein the secondary service controller identifier is assigned by the primary service controller, using the primary controller identifier and a relative location of the secondary service controller to the primary service controller.

6. The method of claim 1, wherein the primary service controller comprises a Rack Management Controller, and wherein the secondary service controller comprises a Baseboard Management Controller.

7. The method of claim 1, further comprising:
transmitting the DHCP response packet to the secondary service controller.

8. The method of claim 1, further comprising:
storing the secondary service controller identifier and the IP address in a topology table.

9. A system, comprising:
a processor; and
a memory device including instructions that, when executed by the processor, cause the system to:
receive, at the system, a customized identifier associated with a computing node, the customized identifier being assigned to the computing node by a service controller associated with the computing node;
assign an Internet Protocol (IP) address to the computing node based at least in part on the customized identifier, wherein the IP address is assigned by the system to pair with the customized identifier; and
transmit the IP address to the computing node.

10. The system of claim 9, further comprising:
store the customized identifier and the IP address in a topology table.

11. The system of claim 9, wherein the customized identifier is a physical location identifier.

12. The system of claim 9, wherein the customized identifier is a customized MAC address generated by the service controller.

13. The system of claim 9, wherein the service controller is a Baseboard Management Device.

14. The system of claim 9, wherein the customized identifier is stored in a Dynamic Host Configuration Protocol (DHCP) request packet, and wherein the IP address is stored in a DHCP response packet.

15. The system of claim 9, wherein the system is operable to generate a topology table containing the customized identifier and the IP address.

16. A method, comprising:
receiving, at a secondary service controller associated with a computing node, a customized computing node identifier, the customized computing node identifier being assigned to the computing node by a primary service controller associated with the computing node;
generating a Dynamic Host Configuration Protocol (DHCP) request packet including the customized computing node identifier;
transmitting the DHCP request packet to a DHCP server; and
receiving a DHCP response packet having an IP address assigned for the computing node, wherein the IP address is assigned by the DHCP server to pair with the customized computing node identifier.

17. The method of claim 16, further comprising:
converting the customized computing node identifier to a customized MAC address.

18. The method of claim 16, wherein the customized computing node identifier is a physical location identifier.

19. The method of claim 16, wherein the secondary service controller is a Baseboard Management Controller.

20. The method of claim 19, wherein the primary service controller is a Rack Management Controller.

* * * * *